Patented Feb. 22, 1938

2,109,299

UNITED STATES PATENT OFFICE 2,109,299

CHEMICAL COMPOSITION

Joseph Grange Moore, Runcorn, England, assignor to Imperial Chemical Industries Limited, a corporation of Great Britain No Drawing. Application April 6, 1936, Serial No. 73,043. In Great Britain April 25, 1935

5 Claims. (Cl. 260—1)

This invention relates to an improved process for the manufacture of halogen derivatives of rubber, e. g., rubber hydrochloride.

The combination of hydrogen chloride with rubber is a reaction which has been investigated largely with a view to throwing light on the composition of rubber. A usual method has been to combine the rubber with the hydrogen chloride in the presence of a solvent for the rubber and the product, e. g. chloroform, or preferably benzene. This method is quite satisfactory for laboratory use where the evaporation of the solvent is of relatively small importance, even from dilute solutions. There are, however, obvious economic disadvantages when operating such processes on a commercial scale for the production of rubber hydrochloride which is not very soluble in the usual commercially available volatile solvents suitable as vehicles for the reaction.

It has now been found that the reaction between rubber and hydrogen halides can be carried out very conveniently by using an amount of solvent which is sufficient to dissolve the initial amount of rubber, but is not sufficient to form a homogeneous solution of the hydrohalide produced.

In this method of working, as the hydrogen halide reacts with the rubber solution, rubber hydrohalide forms and as the hydrohalogenation approaches completion there is a gradual separation of the reaction mass into a liquid phase and a gel of rubber hydrohalide. To achieve the maximum separation the mass should be allowed to stand for some hours, e. g. 3 hours or more, after hydrohalogenation. By this means a greater yield is obtained and the separation of the gel from the liquid is facilitated. The course of the hydrohalogenation can be followed by periodically withdrawing samples from the reaction mass and precipitating the hydrohalide by means of methanol. As long as the hydrohalogenation is incomplete the precipitate is a sticky, rubbery mass, while the mass which comes down when the reaction is complete has lost the sticky nature.

The gel of rubber hydrohalide containing some solvent can be readily separated by filtration from the bulk of the solvent, which can then be reused for the main reaction being used to dissolve further rubber which is then hydrohalogenated. The solvent remaining with the product can be easily separated by gentle heating, preferably in vacuo, steam distillation, or by washing with a suitable liquid such as methyl alcohol.

Solvents which may be used to carry out the process include benzene, toluene, xylene, monochlorbenzene, or orthodichlorbenzene. The rubber used is preferably crepe rubber, which may have been masticated or otherwise treated to reduce its solution viscosity; scrap rubber or gutta percha may also be employed where these are soluble in the solvents used. The solution of rubber itself may also be treated to reduce its viscosity prior to treatment with the hydrogen halide.

The minimum concentration of rubber solution which will give a precipitate of rubber hydrohalide will, of course, be different for each solvent and for each hydrohalide. Thus, in preparing rubber hydrohalide using benzene as a solvent, I prefer to use an initial solution containing more than about 3% by weight of crepe rubber. The upper limit to the concentration of the rubber solution will, for practical purposes, be determined by its viscosity, since with too viscous a solution it is difficult to secure intimate contact between the hydrogen halide and every part of the solution. The viscosity of the rubber solution may, of course, be reduced by exposure to actinic rays or otherwise, or the solution may be made using rubber which has been masticated, or otherwise treated to reduce its solution viscosity, and in this way it is possible to use solutions of greater concentration than would otherwise be possible. Normally I prefer not to use a solution containing more than 6% rubber.

In carrying out the reaction between the rubber and the hydrogen halide, I find it advantageous to pass the gaseous hydrogen halide in excess into the rubber solution until there is substantially no further absorption. I prefer to use the gas in a dry condition and to bring about as intimate a contact between the gas and liquid as is possible, e. g. to pass the gas through perforations, and to use somewhat vigorous stirring. The advantage is thus realized that the rubber hydrohalide which separates out does so in a more easily filterable form. The temperature which I find suitable is at approximately atmospheric temperature or below, and the reaction mixture may be cooled by known methods. The excess of hydrogen halide is recovered by absorption in water, or may, if desired, be passed into a further quantity of rubber solution.

In one form of my invention, the solution of rubber in, e. g. benzene, is treated, preferably at ordinary temperatures, with gaseous hydrochloric acid until reaction is complete, say in about 48 hours, and the resulting soft slurry filtered wither in a press or by suction, with or without the application of slight pressure to reduce the solvent content of the cake. The cake produced in this manner is a white or light coloured mass which on breaking up presents a soft granular appearance. The benzene remaining in the cake after filtration may be as much as 80% by weight, the precise amount depending on the conditions of filtration, and can be removed by washing with methyl alcohol or the like; it is preferable not to remove too great a proportion of solvent on the filter, or to employ more than a slight pressure, since under such circumstances a hard mass is produced, from which it is difficult to remove the last traces of solvent by washing with methyl alcohol or by steam distillation. Finally, the product is dried in a current of warm air, e. g. at about 30° C.

The following example illustrates but does not limit the invention:—

4.0 kgs. of pale crepe rubber were dissolved in 100 litres of benzene by stirring at 50° C. under a condenser. When the solution was homogeneous the temperature was reduced to 15° C. and hydrochloric acid gas was passed in, vigorous agitation being maintained.

Hydrochlorination proceeded until a small sample of the solution on precipitation by cold methanol yielded a white non-sticky solid; at this stage the stream of hydrochloric acid gas was stopped and the solution was allowed to stand for 24 hours to mature. The slurry which formed was filtered by suction, the filtrate consisting of benzene which yielded no further solid on treatment with methanol. The soft gelatinous mass retained on the filter was washed with a little fresh benzene to remove contaminating liquor, and was pressed lightly to express the bulk of the remaining benzene. The mass was then broken up under two volumes of methanol, washed well with methanol, pressed lightly, and dried under partial vacuum at 30° C.

Although in the above description a preferred embodiment, namely the hydrochlorination of rubber dissolved in benzene has been detailed, the process is applicable to the hydrohalogenation of rubber with other hydrohalides, namely hydrobromide and hydroiodide. The process is generally applicable to hydrohalogenation of rubber dissolved in a solvent sufficient in amount to dissolve all of the hydrohalide produced. Thus, toluene, xylene, monochlorobenzene and orthodichlorobenzene have been found to be applicable.

The above description and example are intended to be illustrative only. Any modification of or variation therefrom which conforms to the spirit of the invention is intended to be included within the scope of the claims.

I claim:

1. The process for the preparation of rubber hydrochloride which comprises passing gaseous hydrogen chloride into a benzene solution containing in solution at least 3% of crepe rubber, until there is a separation of the reacting mass into a liquid phase consisting of benzene which yields no further solid on treatment with methanol, and a gel of rubber hydrochloride, and separating off the precipitated rubber hydrochloride.

2. The process for the preparation of rubber hydrochloride which comprises passing gaseous hydrogen chloride into a solution of raw rubber in benzene, the benzene being present in an amount sufficient to dissolve all the rubber but insufficient to dissolve the rubber hydrochloride formed, and continuing the passage of hydrogen chloride until there is a separation of the reacting mass into a liquid phase consisting of benzene which yields no further solid on treatment with methanol, and a gel of rubber hydrochloride.

3. The process for the preparation of rubber hydrochloride which comprises treating with hydrogen chloride a solution of raw rubber in benzene, the benzene being present in amount sufficient to dissolve all the rubber but insufficient to dissolve all the rubber hydrochloride formed, and continuing the treatment with hydrogen chloride until there is a separation of the reacting mass into a liquid phase consisting of benzene which yields no further solid on treatment with methanol, and a gel of rubber hydrochloride.

4. The process for the preparation of rubber hydrochloride which comprises treating with hydrogen chloride a solution of raw rubber in a solvent, the solvent being present in an amount sufficient to dissolve all the rubber but insufficient to dissolve all the rubber hydrochloride formed, and continuing the treatment with hydrogen chloride until there is a separation of the reacting mass into a liquid phase consisting of the solvent which yields no further solid on treatment with methanol, and a gel of rubber hydrochloride.

5. The process for the preparation of rubber hydrohalide which comprises treating with hydrogen halide of the class consisting of hydrogen chloride, hydrogen bromide and hydrogen iodide, a solution of raw rubber in a solvent, the solvent being present in amount sufficient to dissolve all the rubber but insufficient to dissolve all the rubber hydrohalide formed, and continuing the treatment until there is a separation of the reacting mass into a liquid phase consisting of the solvent which yields no further solid on treatment with methanol, and a gel of rubber hydrohalide.

JOSEPH GRANGE MOORE.